United States Patent [19]

Thacker et al.

[11] Patent Number: 5,276,851
[45] Date of Patent: Jan. 4, 1994

[54] AUTOMATIC WRITEBACK AND STORAGE LIMIT IN A HIGH-PERFORMANCE FRAME BUFFER AND CACHE MEMORY SYSTEM

[75] Inventors: Charles P. Thacker, Palo Alto, Calif.; David G. Conroy, Maynard, Mass.

[73] Assignee: Digital Equipment Corporation, Maynard, Mass.

[21] Appl. No.: 972,885

[22] Filed: Nov. 6, 1992

Related U.S. Application Data

[63] Continuation of Ser. No. 455,952, Dec. 22, 1989, abandoned.

[51] Int. Cl.⁵ .......................................... G06F 12/16
[52] U.S. Cl. ............................ 395/425; 364/DIG. 1; 364/228.1; 364/229.1; 364/229.2; 364/243.1; 364/243.4; 364/243.43; 364/259.8

[56] References Cited

U.S. PATENT DOCUMENTS

| | | | |
|---|---|---|---|
| 4,075,686 | 2/1978 | Calle et al. | 395/275 |
| 4,077,059 | 2/1978 | Cordi et al. | 395/600 |
| 4,084,231 | 4/1978 | Capozzi et al. | 395/425 |
| 4,141,067 | 2/1979 | McLagan | 395/425 |
| 4,268,907 | 5/1981 | Porter et al. | 395/425 |
| 4,429,363 | 1/1984 | Duke et al. | 395/250 |
| 4,433,374 | 2/1984 | Hanson et al. | 395/425 |
| 4,466,059 | 8/1984 | Bastain et al. | 395/250 |
| 4,500,954 | 2/1985 | Duke et al. | 395/275 |
| 4,685,082 | 8/1987 | Cheung et al. | 365/49 |
| 4,742,454 | 3/1988 | Robinson et al. | 395/250 |
| 4,937,738 | 6/1990 | Uchiyama et al. | 395/425 |
| 4,939,641 | 7/1990 | Schwartz et al. | 395/425 |
| 4,942,518 | 7/1990 | Weatherford | 395/800 |
| 4,956,803 | 9/1990 | Tayler et al. | 395/425 |
| 5,025,366 | 6/1991 | Baror | 395/425 |
| 5,027,310 | 6/1991 | Chang et al. | 340/731 |
| 5,045,996 | 9/1991 | Barth et al. | 395/425 |
| 5,056,002 | 10/1991 | Watanabe | 364/200 |

OTHER PUBLICATIONS

Charles P. Thacker, "Cache Strategies for Shared Memory Multiprocessors," New Frontiers in Computer Architecture Conference Proceedings, Citicorp/TTI (Mar. 1986).

C. P. Thacker, L. C. Stewart, and E. H. Satterthwaite, Jr., "Firefly: A Multiprocessor Workstation," IEEE Transactions on Computers, vol. 37, No. 8, pp. 909-920 (Aug. 1988).

*Primary Examiner*—Joseph L. Dixon
*Assistant Examiner*—Hiep T. Nguyen
*Attorney, Agent, or Firm*—Flehr, Hohbach, Test, Albritton & Herbert

[57] ABSTRACT

A computer system includes a plurality of central processing units (CPUs) each of which has a direct napped cache memory. The system also includes a main memory, and one or more display frame buffers. The cache normally operates in a write back mode, whereby updated data is written back to main memory only when a cache block is reallocated to store a new block of data. A tag for each block of data stored in the cache includes a Shared flag which indicates whether the corresponding block of data may be stored in the cache of another CPU. When a block of data stored is modified, it is immediately written to main memory if the tag for that block has an enabled Shared flag. To make the cache operate in a write-through mode for blocks of image data, the system stores an enabled Shared flag in the cache whenever a block of frame buffer data is stored in the cache. A circuit in the cache detects when the CPU is writing an entire block of image data to an address in the frame buffer and causes the cache to write the block of image data directly to the frame buffer without storing the image data in the cache. An address circuit in the cache stores image data from the frame buffer only in a predefined fraction of the cache, and thereby restricts the amount of other data stored in the cache which may be displaced by image data.

23 Claims, 4 Drawing Sheets

AUTOMATIC WRITEBACK AND STORAGE LIMIT IN A HIGH-PERFORMANCE FRAME BUFFER AND CACHE MEMORY SYSTEM

This application is a continuation of application Ser. No. 07/455,952, filed Dec. 22, 1989, now abandoned.

The present invention relates generally to multiprocessor computer systems which include display frame buffers and cache memories and particularly to methods and systems for overcoming problems involved in the use of "write back" cache memories when updating image data stored in a frame buffer.

BACKGROUND OF THE INVENTION

Referring to FIG. 1, a system 100 containing high-performance central processing units (CPUS) 102, 104, 106 will usually provide a cache memory 112, 114, 116 for each CPU. The system may also include other types of processors, such as an input/output processor 118. A cache memory increases the CPU's performance by satisfying most of the CPU's memory references, instead of requiring a reference to main memory 120 for every reference made by the CPU. Since the access time of the cache (e.g., 10 nanoseconds) is usually much less than the access time of main memory (e.g., 400 nanoseconds), performance is increased.

In a multiprocessor system in which a number of processors 102-106 and their caches 112-116 share a common memory bus 122, the caches also serve to shield the bus from the memory traffic generated by the CPUS. A "write back" strategy, which returns a cache block to main storage 120 only when the cache block is needed for another address, is a particularly effective method of reducing bus traffic.

With the availability of dual-ported dynamic memories, commonly known as video RAMS, it has become straightforward to build frame buffers 124, 126 that place the display pixelmap (also known as a bit map) in the physical address space of one or more CPUS. The video RAMs in such frame buffers have a serial port, which is used to refresh a raster-scanned monitor 130 or 132, and a parallel port used by the CPUs for updating the image data stored in the video RAMs. Using the CPU to update the contents of the frame buffers can represent a substantial savings over using specialized hardware, and the rate at which updates to an image can be computed and stored in a frame buffer is quite respectable using currently available high performance CPUs.

When a write-back cache is used in conjunction with a memory-mapped frame buffer, three problems can occur.

The first problem with using a write-back cache in conjunction with a frame buffer is that data values in the cache are not written back to the frame buffer until the cache block holding the frame buffer data is needed to hold some other block of data. Thus changes to the image on the display may be delayed for an arbitrary amount of time after the pixelmap is modified by the CPU. In other words, the displayed image may not reflect the computed image data for an unpredictable period of time.

The second problem is that caches frequently fetch an entire block of information from main memory whenever the cache does not contain a referenced address, even when the operation issued by the CPU is a write operation. For normal programs, this is a good strategy, since most locations are read before they are written. In a frame buffer, this is frequently not the case, and locations are often written without being read first. In this case, the data fetched into the cache will be overwritten immediately, so the fetch represents wasted work.

The third problem concerns the tendency of frame buffer data to displace other data blocks needed in the cache. In a direct mapped cache the data stored in a particular address in main memory can be stored in only one location in the cache. Direct napped caches are frequently used because they are effective and lower cost than other cache mapping organizations. Unfortunately, when a direct mapped cache is used with a frame buffer, overall system performance may be severely degraded. The reason for this is that the references made by a CPU to a frame buffer may not exhibit the spatial and temporal locality of normal program references. In particular, it is often the case that a long run of sequential frame buffer locations will be referenced, with each location being referenced exactly once. The result of this is that a direct mapped cache will become filled with display data, which will displace other cache information, including the data and program text of the program that modified the display image. This displacement will cause the number of cache misses to increase substantially, increasing the average access time seen by the CPU and lowering the system's performance.

The standard, prior art solution to the above problems is to operate frame buffers in an uncached portion of the system's address space. This means that such systems cannot take any advantage of the presence of a cache for the processing of frame buffer (i.e., image) data.

The present invention addresses each of the three problems listed above. By making modifications to the design of the cache and the frame buffer, it provides a design that supports frame buffers more effectively than previous arrangements.

SUMMARY OF THE INVENTION

In summary, the present invention is a multiprocessor computer system including a number of CPUS, each having a direct mapped cache memory, a main memory, and one or more frame buffers. Each cache normally operates in a write back mode, whereby updated data is written back to main memory only when a cache block is reallocated to store a new block of data. The cache includes a tag for each block of data stored in the cache. Each tag denotes what portion of the computer's address space is stored in a corresponding cache block, and includes a Shared flag which indicates whether the corresponding block of data may be stored in the cache of another CPU. When a block of data stored is modified, it is immediately written to main memory if the tag for that block has an enabled Shared flag.

To make the cache operate in a write-through mode for blocks of image data, the system stores an enabled Shared flag in the cache whenever a block of frame buffer data is stored in the cache. In addition, a circuit in the cache detects when the CPU is writing an entire block of image data to an address in the frame buffer and causes the cache to write the block of image data directly to the frame buffer without storing the image data in the cache. Finally, an address circuit in the cache causes image data from the frame buffer to be stored only in a predefined fraction of the cache, and thereby restricts the amount of other data stored in the cache which may be displaced by image data.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
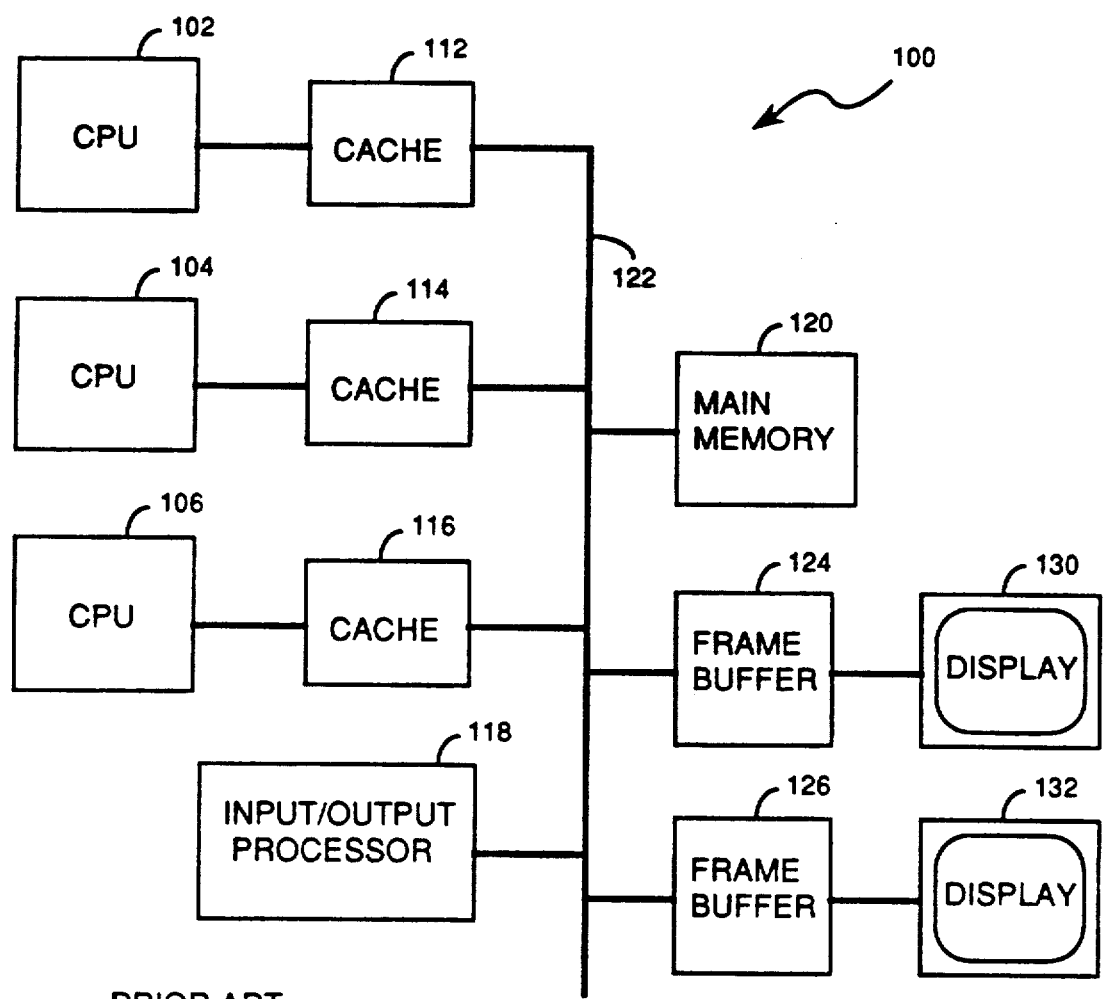
FIG. 1 is a block diagram of a multiprocessor computer system including a plurality of processors with caches memories, and also one or more frame buffers.
Figure 2:
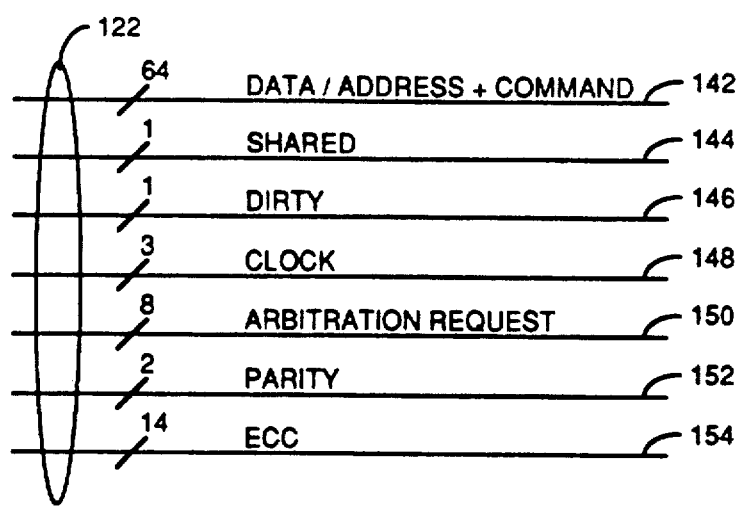
FIG. 2 shows the components of the shared memory bus in the preferred embodiment.

Referring to FIGS. 1 and 2, before describing the present invention, we will describe the basic operation of the multiprocessor computer system in which the preferred embodiment operates.

CACHE COHERENCE AND MEMORY BUS STRUCTURE

The CPUs 102, 104 and 106 in the system 100 utilize cache memories and have overlapping address spaces. Therefore it is possible for several copies of a particular block of memory to concurrently exist in the caches of different processors. Maintaining "cache coherence" means that whenever data is written into a specified location in a shared address space by one processor, the caches for the other processors perform a "cache snoop" operation, during which each cache determines whether it also stores the specified same memory location. If so, the snooping cache updates or otherwise flags the updated block in its cache array. Numerous prior art articles have discussed various aspects of cache coherence. See for example, C. P. Thacker, L. C. Stewart, and E. H. Satterthwaite, Jr., "Firefly: A Multiprocessor Workstation," IEEE Transactions on Computers, Vol. 37, No. 8, pp. 909-920 (August 1988); and, Charles P. Thacker, "Cache Strategies for Shared-Memory Multiprocessors," New Frontiers in Computer Architecture Conference Proceedings, Citicorp/TTI (March 1986), both of which are hereby incorporated by reference.

Although the exact operation of the shared memory bus 122 is not relevant to the present invention, some background information on its operation is useful for understanding the operation of the preferred embodiment. In the preferred embodiment the memory bus 122 includes a 64 bit binary data bus 142 which is also used to transmit address signals and read/write commands, a Shared signal line 144, a dirty signal line 146, three clock lines 148, an arbitration bus 150, two parity lines 152 and fourteen binary lines 154 for transmitting error correction codes.

The arbitration bus 150 is used to arbitrate simultaneous requests to use the bus. The clock lines 148 are used to control the timing of data transmissions over the memory bus 122, and the parity and error correction code lines 152 and 154 are used to transmit standard parity and error correction code signals.

Only the use of the data bus 142 and the Shared signal line 144 are relevant to the present invention. The 64 binary data/address lines 142 are time multiplexed so that address and command signals are transmitted during a first time period, and data are transmitted over the same lines during later time periods. When a CPU access to its cache results in a miss, the cache transmits a read command and a specified address on the bus 122. Normally, the requested block of data is then transmitted by the main memory 120 onto the memory bus 122. However, if any of the other caches contain more up-to-date data for the specified address, that cache asserts an enable signal on the dirty line 146, in which case that cache sends the requested data instead of the main memory.

BASIC OPERATION MAPPED CACHE

Figure 3:
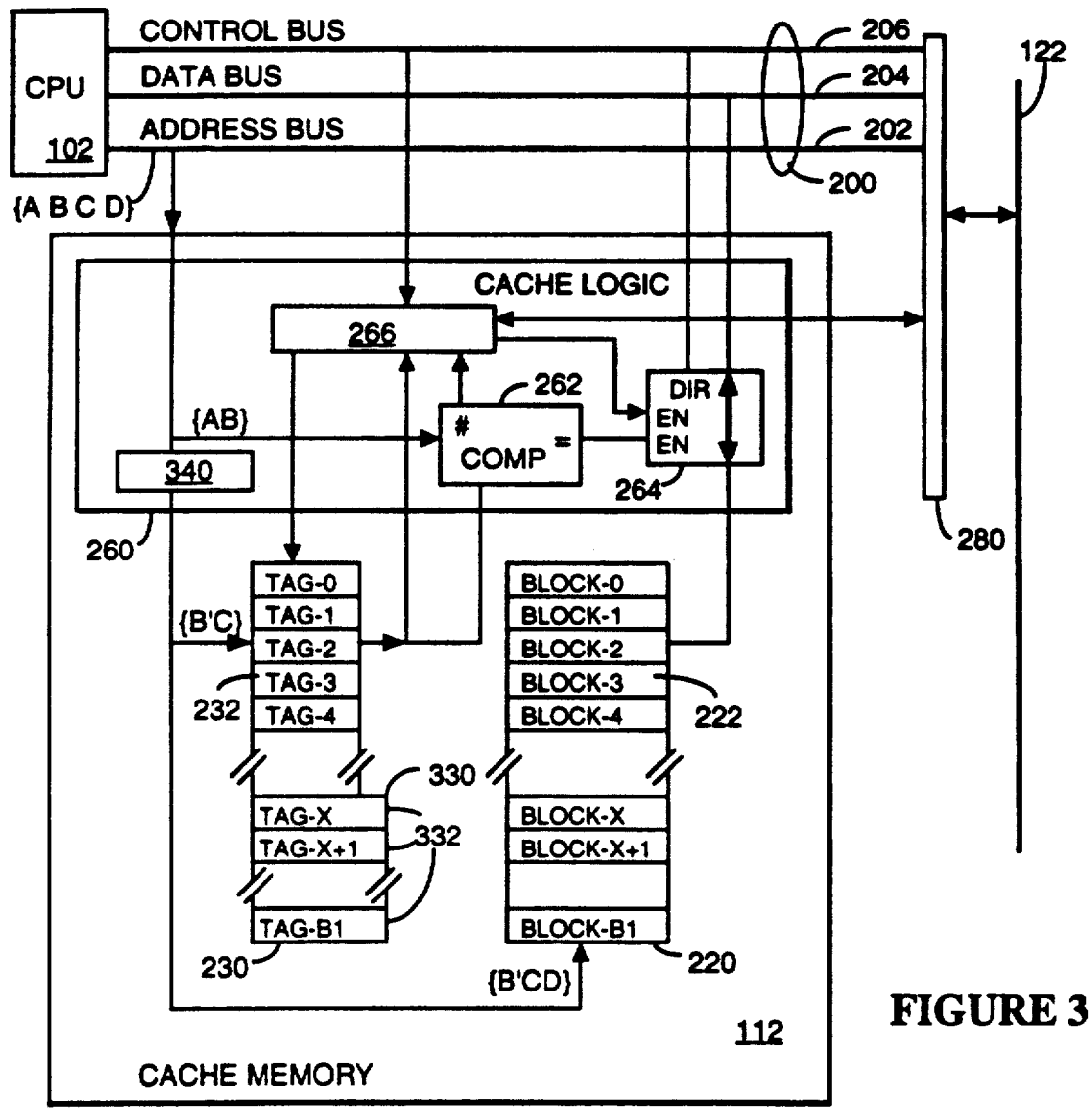
FIG. 3 is a block diagram of a cache memory in accordance with the present invention.

Referring to FIG. 3, each CPU has a local bus 200, including an address bus 202, a data bus 204 and a control bus 206. The address bus 202 carries a set of binary address signals. For convenience, the address bits are broken down into four subsets, denoted here as ABCD, where "A" denotes the most significant bits, "B" denotes one or more of the next most significant bits, and so on through "D" which denotes the least significant bits. The reason for dividing the bits of each address into four portions will become apparent from the following discussion.

Direct map caches work as follows. The cache 112 contains a high speed memory array 220, which includes a set of B1 blocks, and having an access time of about 10 nanoseconds. Each block 222 in the array 220 has a set size, which is generally equal to a power of 2 (i.e., $2^X$, where X is a positive integer). In the preferred embodiment, each block 222 contains eight "words", where each word contains four bytes. Thus, the basic addressable storage unit is a thirty-two bit word, and three address bits are required to select a specified word in a block 222. In addition, there is a high speed tag memory 230 which stores one tag 232 for each block 222.

Figure 4:
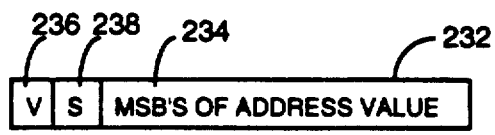
FIG. 4 depicts one tag in the tag array of a cache memory.

Referring to FIG. 4, each block's tag 232, contains an address value 234 which, along with the position of block in the array 220, identifies the location in main memory of the block 222. Furthermore, each tag 232 contains two status flags for each block 222: a "valid flag" 236 which denotes whether the block 222 contains valid data, and a "SHARED flag" 238 which denotes whether or not the same block of data may be stored in the cache of any other processor in the system.

The operation of the SHARED flag in cache memories, including cache memories in the prior art, is as follows. When any one cache, such as cache 112 in FIG. 1 fetches a block of data from main memory, if that same block data is also stored in any other cache, such as cache 114, that other cache asserts an enabled SHARED signal on the Shared line 144 so that the cache doing the fetch will know that another cache also holds that block. As a result, both the caches 112 and 114 will set the SHARED flag 238 in the tag 232 for the block. Clearly, once a SHARED flag 238 for a particular block is set, the shared block of data may be overwritten in the other cache with another block of data, in which case the block of data will no longer be shared by two caches. However, the SHARED flag is still set in the one cache which still stores the previously shared block of data. Therefore the SHARED flag 238 denotes that a particular block of data may be shared with another processor.

Whenever the cache 112 writes new data into a cache block 222, cache logic circuit 266 inspects the SHARED flag 238 for that block's tag. If the SHARED flag is enabled, the cache logic circuit 266 performs a write-through operation—which means that after the new data is stored in the block, the cache logic writes the entire block to main memory 120 (and to any other caches which share the block) via the shared memory bus 122.

Figure 5:
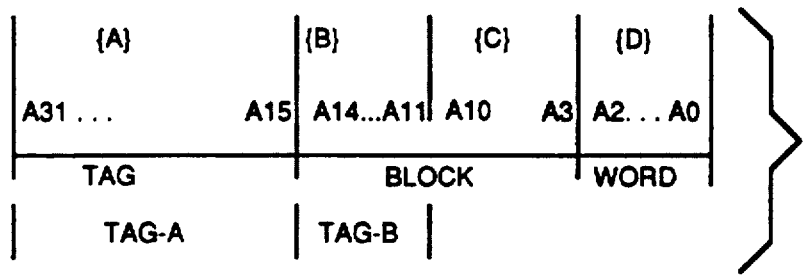
FIG. 5 shows the allocation of address bits for the preferred embodiment of the present invention.

Referring to FIG. 5, the address space of the main memory is represented by address bits ABCD, where "D" is the set of bits required to specify the address or location of each word in a cache block 222. Bits "BC" act as an index into the arrays 220 and 230 and identify the position of the block 222 in the array 220 which is being accessed. The tag 232 for a particular line stores the "A" address bits of a particular block of memory. Thus the main memory location of the data stored in a cache block 232 is identified by "A" (from the corresponding tag) and "BC" (the index value of the block).

In the preferred embodiment, there are thirty-two address bits A31 through A0, with A31 being equal to "1" only for locations stored in frame buffers. The "A" address bits are A31 through A15, the "B" address bits are A14–A11, the "C" address bits are A10–A3, and the "D" address bits are A2–A0. Thus, the cache 112 contains 4096 blocks, each of which stores eight words. Each cache block 222 can store data from any one of $2^{17}$ memory locations in the computer system's address space, as represented by the seventeen bit address value stored in the corresponding tag 232.

Note that the frame buffers 124 and 126 are treated logically as part of main memory 120. Thus, we say that a block of data is "written to main memory", even if the block of data is image data with an address having A31 equal to "1" which is stored in a frame buffer. From another viewpoint the frame buffers can be considered simply to be portion of main memory 120, with main memory having standard access circuitry that stores data in different portions of the address space in different sets of memory circuits.

Normal operation of the cache 112 is as follows. When the CPU 102 performs a memory access, the address to be accessed is asserted on the address bus 202, and read/write control signals are asserted on the control bus 206. During write operations, data is also asserted on the data bus 204. Denoting the asserted address as ABCD, as described above, the cache control logic 260 uses the "BC" address bits to index into the tag array 230. A comparator 262 compares the value of the indexed tag 232 with the "A" address bits on the address bus 202. While this comparison is being performed, the cache array 220 is accessed using address bits "BCD". If the comparator 262 determines that the address value 234 stored in tag 232 and the "A" address bits are equal, and that the tag's valid flag 236 is enabled, then buffer 264 is enabled, allowing the flow of data between the addressed location in the cache array 220 and the data bus 204. That is, during a read operation the addressed location in the cache is asserted on the bus 204, and during a write operation the data on the bus 204 is written into the cache at the specified location.

If the comparator 262 in the cache 112 does not find a "hit", the cache logic 266 passes the access request to its shared memory bus interface 280, which then fetches from main memory the specified datum so as to satisfy the CPU's request. More specifically, the interface 280 fetches from main memory an entire block of data corresponding address bits "ABC" and loads this data into the block 222 of the cache array 220 corresponding to the value of address bits "BC". This enables the cache 112 to satisfy the CPU's request. At the same time, the tag entry 232 for the reference block 222 is updated to denote the source of the new data stored in it.

Logic circuit 266 is a state machine which governs the status of the cache array access circuits 262 and 264. Logic circuit 266 also governs the process of loading new blocks of data into the cache when the CPU references a memory location that is not stored in the cache.

SOLUTION TO FIRST PROBLEM

The first problem is that data values in a "write back" cache are not written back to the frame buffer until the cache block holding the frame buffer data is needed to hold some other block of data. The solution to this problem is make the cache operate in a "write-through" mode for those cache blocks which hold frame buffer data. See the above description of write-through cache operation. Additional information regarding write-through cache operation can be found in C. P. Thacker, L. C. Stewart, and E. H. Satterthwaite, Jr., "Firefly: A Multiprocessor Workstation," IEEE Transactions on Computers, Vol. 37, No. 8, pp. 909–920 (August 1988); and, Charles P. Thacker, "Cache Strategies for Shared-Memory Multiprocessors," New Frontiers in Computer Architecture Conference Proceedings, Citicorp/TTI (March 1986), both of which were cited and incorporated by reference above.

Figure 6:
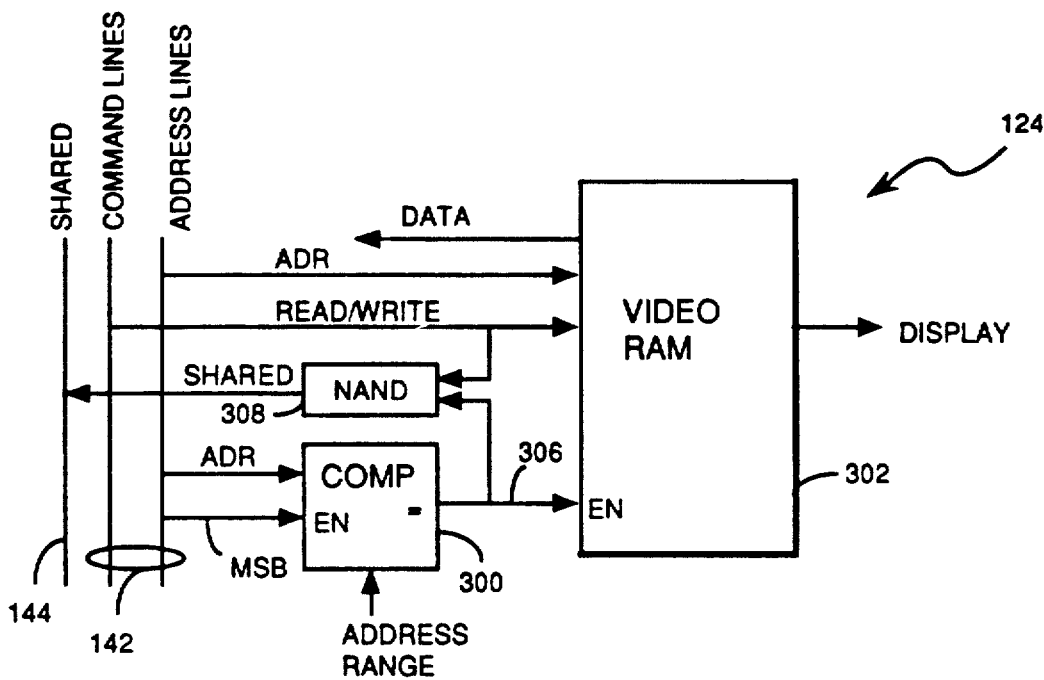
FIG. 6 is a block diagram of a frame buffer in accordance with the present invention.

Referring to FIG. 6, the solution to the first problem is to modify a standard frame buffer 124 so that it asserts an enabled SHARED signal on the Shared line 144 of the memory bus. This is done as follows. Whenever a memory read or write operation is performed, the comparator 300 checks to see if the specified address corresponds to the portion of the address space that is stored in the frame buffer's video RAM 302. The comparator is enabled only if the most significant bit, A31, is equal to "1", and a predefined number of the remaining most significant bits are compared with a predefined address range value. If the specified address is in the frame buffer 124, an enabled "frame buffer access" signal is asserted on line 306, which enables access to the video RAM 302.

The "frame buffer access" signal on line 306 is logically ANDed with the Read command signal from the memory bus by NAND gate 308, and the resulting SHARED signal is asserted on the Shared signal line 144. Thus, if any CPU reads a block of data from the frame buffer a negative logic SHARED signal is asserted on the Shared line 144.

Referring to FIG. 3, the SHARED signal generated by the modified frame buffer 124 causes the cache logic 266 of the cache which receives the frame buffer data to store an enabled SHARED flag 238 in the tag for the receiving cache block. As a result, whenever a CPU 102 modifies new frame buffer data values which are stored in its cache, a write-through operation will be performed by the cache logic 266 because the SHARED flag for the access cache block will be enabled.

This solves the first problem because updated frame buffer data is automatically written into the frame buffer, which overcomes the problems associated with using a "write back" cache in conjunction with a direct mapped frame buffer.

SOLUTION TO SECOND PROBLEM

The second problem is solved by changing the strategy used by the cache control logic 260 to allocate cache blocks. In particular, rather than assigning a block to an address and fetching the new contents from main memory 120 whenever the location referenced by the CPU is not contained in the cache, we do so only if the reference is a read operation, or is a write of less than a full cache block. When the CPU does a write of a full block, the cache does not allocate a block for the referenced address and fetch its contents. Instead, it simply writes the block to memory, bypassing the cache. This avoids useless fetches of frame buffer data.

Full block writes are typically accomplished either by (1) setting the size of the cache block to one word, or (2) by using a CPU which contains write buffers capable of accumulating data written to a cache block and issuing the entire block as a single write operation. The first of these two options is employed in the Firefly system, discussed in the "Firefly" article cited above, and the second of these two options is employed in the preferred embodiment of the present invention.

Figure 7:
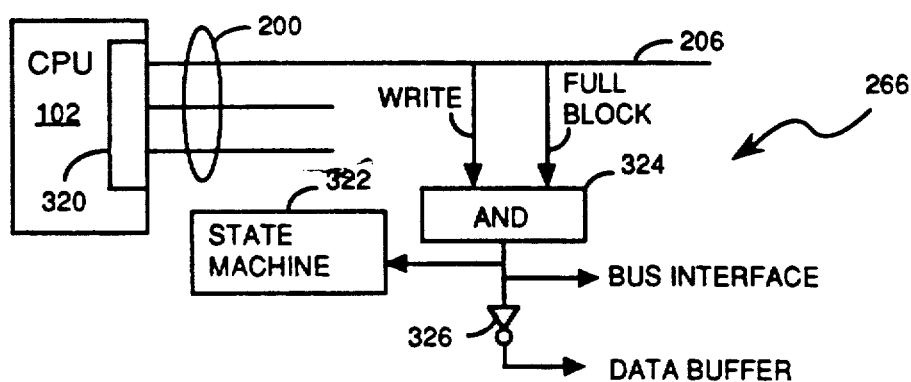
FIG. 7 is a block diagram of a portion of the cache control logic for avoiding fetches of certain frame data.

Referring to FIG. 7, the CPU 102 includes write buffers 320 which store data being written by the CPU 102 and issue full blocks of data as a single write operation using the control signals Write and FullBlock. The cache control logic circuit 266 includes a state machine 322, and an AND gate 324 which logically ANDs the Write and Full Block signals on the CPU's control bus 206. When both Write and Full Block are enabled, the CPU is writing a full block (i.e., eight words) of data. The output of the AND gate is sent to the bus interface 280, which instructs the interface 280 to transmit the data to the specified address. The output of the AND gate is inverted by inverter 326, and the resulting signal is used to disable the cache's data buffer 264 so that the data from the CPU will not be written into the cache block array 220. Furthermore, the output from the AND gate 324 is sent to the cache logic's state machine 322, which will cause the state machine to ignore the entire data write operation, except for the signal sent to the bus interface 280.

SOLUTION TO THIRD PROBLEM

The third problem is solved by allowing frame buffer data to occupy only a small fraction of the cache 120. While this area of the cache may become filled with display information, the majority of the cache is not disturbed by accesses made to the frame buffer. This avoids pollution of the cache with frame buffer data and the increased cache miss rate described above.

In the preferred embodiment of the present invention, a direct mapped cache is used. The allocation of address bits for this cache is shown in FIG. 5, corresponding to a cache with 4096 blocks that each store eight words of data.

Referring to FIGS. 3, 4 and 5, to restrict the fraction of the cache into which frame buffer data may be stored, we reserve a region of the address space for frame buffers and interpret these addresses differently when referencing the cache. In the preferred embodiment, we allow frame buffer data to occupy only 1/16 of the cache. Note that we have reserved half of the address space, indicated by A31="1", for frame buffer memory.

As shown in FIG. 3, there is an address circuit 340 which modifies the "B" address bits used for addressing the tag and block arrays 230 and 220.

Figure 8:
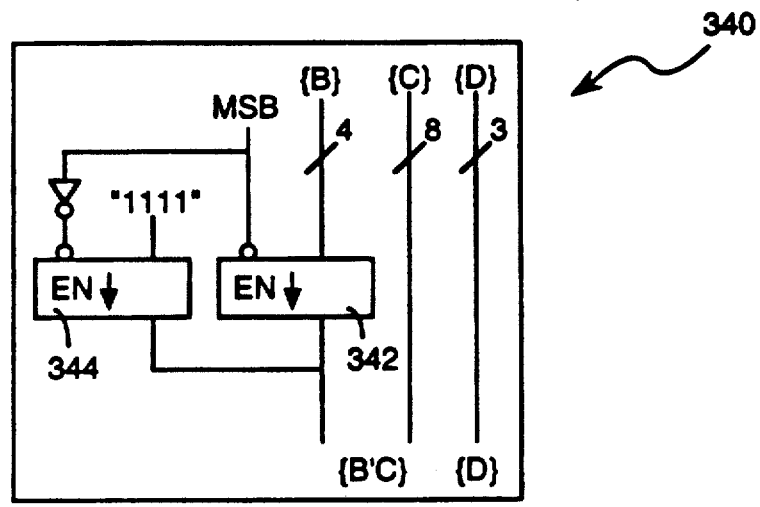
FIG. 8 is a block diagram of an address circuit used in the cache logic of the preferred embodiment.

Referring to FIG. 8, the address circuit 340 works as follows. Whenever the most significant address bit (MSB, also labelled here as A31) on the local address bus 202 is equal "1" the CPU is referencing data in a frame buffer. The address circuit uses the most significant address bit to selectively enable either of two buffers 342 or 344. In particular, when MSB is equal to "0", which means that the CPU is referencing non-frame buffer data, buffer 342 is enabled, and the "B" address bits are transmitted unchanged by the address circuit 340. When MSB is equal to "1" because the CPU is referencing frame buffer data, buffer 344 is enabled, which causes the "B" address bits to be replace with a predefined binary value, such as "1111" by the address circuit 340.

The address circuit 340 thus naps all references to frame buffer locations into a predefined portion of the cache as specified by the predefined binary value for the "B" address bits asserted by buffer 344.

As shown in FIG. 3, the tags 332 in the bottom 1/16 of the tag array 230, marked by reference number 330, are somewhat larger than the other tags. Note that section 330 of the tag array 230 will correspond to whatever predefined value for the "B" address bits that is set in the address circuit 340. The tags 332 in section 330 of the tag array must store address values corresponding to both the "A" and "B" address bits (see FIG. 5), whereas the other tags store only the "A" address bits. The reason for this is that the "B" address bits are needed to determine the exact frame buffer location which is being stored in cache.

Figure 9:
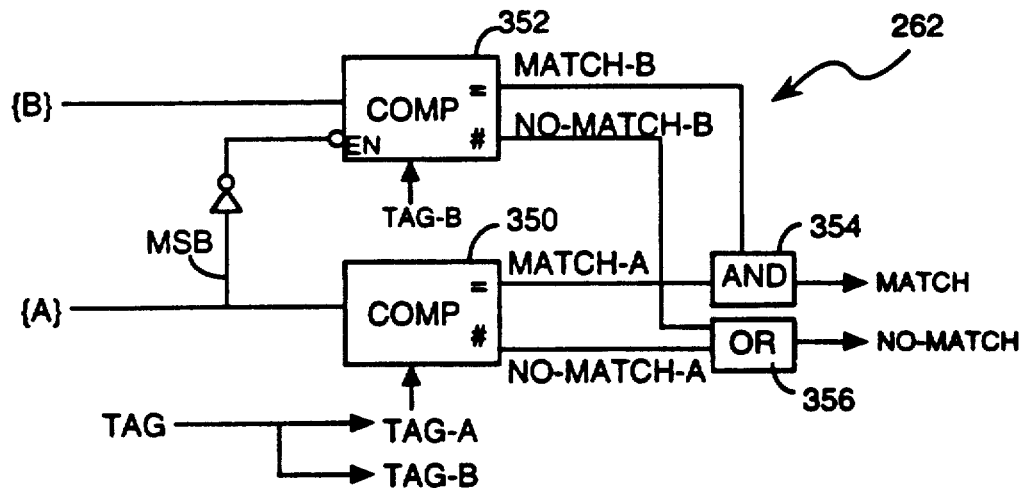
FIG. 9 is a block diagram of a comparator circuit used in the cache logic of the preferred embodiment.

The extra bits in the tags 332 for the portion of the cache into which the frame buffer is mapped are handled as follows. Referring to FIG. 9, the tag data received from the selected tag (i.e., the tag corresponding to the "B'C" address bits) includes two components: TAG-A, which includes the valid flag 236 and address bits corresponding to the "A" address bits, and TAG-B, which corresponds to the "B" address bits stored only in portion 330 of the tag array. The comparator circuit 262 used in the cache logic of the preferred embodiment includes two comparators 350 and 352 each of which produces two output signals. Comparator 350 compares TAG-A with the "A" address bits from the address bus 202. If the two sets of address bits match, and the valid flag is enabled, the comparator 350 outputs an enabled MATCH-A signal, and otherwise outputs an enabled NO-MATCH-A signal. Comparator 352 is enabled only if the CPU is accessing frame buffer data, as indicated by A31 (labelled MSB in FIG. 9) being equal to "1". Comparator 352 compares TAG-B with the "B" address bits from the address bus 202. If the two sets of address bits match, and the valid flag is enabled, the comparator 350 outputs an enabled MATCH-B signal, and otherwise outputs an enabled NO-MATCH-B signal. AND gate 354 combines the two MATCH-A and MATCH-B signals to produce an enabled MATCH signal only if the accessed tag matches the high order address bits on the local address bus 202. OR gate 356 combines the two NO-MATCH-A and NO-MATCH-B signals to produce an enabled NO-MATCH signal if the accessed tag does not match the high order address bits on the local address bus 202.

The combined effect of the address circuit 340, comparator 262 and the tags 332 which store extra address information is to map all frame buffer data into a small portion of the cache 112. The selection of a particular fraction of the cache for frame buffer locations is a tradeoff. A large fraction (e.g., one-half or one-quarter) means that if the pattern of references to the frame buffer exhibits the spatial and temporal locality of normal programs, then the cache makes these references more efficient. On the other hand, a large fraction means that an unfavorable frame buffer reference pattern will displace more "normal" data and program text from the cache. In a planned implementation of this invention, the inventors will use 1/32 of a 128 kilobyte cache for frame buffer data.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, the circuit shown in FIG. 7 for asserting a Shared signal when image data is read from a frame buffer could be replaced by a simple circuit in each cache which stores an enabled SHARED flag whenever a block of frame buffer data is stored in the cache.

What is claimed is:

1. In a computer system having a multiplicity of processors, a main memory coupled to said processors by a memory bus, said main memory storing data at specified addresses within a predefined address space, said predefined address space being at least partially shared by said multiplicity of processors;

said memory bus carrying signals which denote addresses to which data is being stored by said processors;

said main memory including at least one frame buffer for storing image data at addresses in a predefined portion of said address space, and other memory for storing additional data in portions of said address space other than said predefined portion;

display means for displaying image data stored in said at least one frame buffer;

a plurality of cache means coupled to said memory bus, each cache means coupled to one of said processors for providing said processor with access to portions of said address space at higher speed than said main memory, each said cache means including a direct mapped cache array for storing blocks of data and tag means for denoting what portion of said address space is stored in each of said blocks; said tag means including a tag for each said block of data stored in said cache means, said tag denoting an address value, and a shared flag that is enabled when said block of data may be stored in another one of said cache means;

each cache means including cache logic means for automatically writing a block of data stored in said cache means to said main memory whenever said block of data is modified by said processor and said tag for said block has an enabled shared flag; said cache logic means furthermore including means for writing to said main memory blocks of data stored in said cache means that have been modified by said processor and that have a disabled shared flag in said tag for said block only when said blocks of data are displaced from said cache means;

said cache logic means including means for asserting a shared signal on said memory bus whenever any of said multiplicity of processors, other than said processor coupled to said cache means, accesses data that is also stored in said cache means; and each cache means including shared flag logic means for storing an enabled shared flag in said cache means (A) whenever a block of image data from said at least one frame buffer is stored in said cache means, regardless of whether said block of image data may be stored in another one of said cache means, and (B) whenever a block of data is stored in said cache memory means, said block of data having an address in the portion of said address space corresponding to said other memory, and a shared signal present on said memory bus indicates that said block of data stored may also be stored in another one of said cache means; wherein said shared flag logic means stores a disabled status flag in said cache means whenever a block of data having an address in the portion of said address space corresponding to said other memory is stored in said cache means and no shared signal is present on said memory bus;

whereby said cache means always writes modified blocks of image data to said at least one frame buffer, and writes modified data, shared with other ones of said cache means and having an address in the portion of said address space corresponding to said other memory, to said other memory.

2. In a computer system as set forth in claim 1, said cache logic means including block writing means for detecting when said processor coupled to said cache means is writing a block of image data to said at least one frame buffer and for writing said block of image data directly to said at least one frame buffer without storing said block of image data in said cache array.

3. In a computer system as set forth in claim 1, said cache logic means including address circuit means for storing blocks of image data from said at least one frame buffer only in a predefined portion of said cache array, said predefined portion comprising no more than one half of said cache array;

whereby said cache logic means restricts the amount of other data stored in said cache which may be displaced by image data from said at least one frame buffer.

4. In a computer system as set forth in claim 3, wherein said tags for said predefined portion of said cache array each include means for denoting an address value indicative of a portion of said at least one frame buffer which is stored in the corresponding block of data in said cache array.

5. In a computer system having a multiplicity of processors, a main memory coupled to said processors by a memory bus, said main memory storing data at specified addresses within a predefined address space, said memory bus including an address bus carrying address signals, said predefined address space being at least partially shared by said multiplicity of processors;

said main memory including at least one frame buffer for storing image data at addresses in a predefined portion of said address space, and other memory for storing additional data in portions of said address space other than said predefined portion;

display means for displaying image data stored in said at least one frame buffer;

a plurality of cache means coupled to said memory bus, each cache means coupled to one of said processors for providing said processor with access to portions of said address space at higher speed than said main memory, each said cache means including a direct mapped cache array for storing blocks of data and tag means for denoting what portion of said address space is stored in each of said blocks; said tag means including a tag for each said block of data stored in said cache means;

each cache means including cache logic means for storing blocks of image data from said at least one frame buffer only in a predefined portion of said cache array, said predefined portion comprising no more than one half of said cache array; said cache logic means including address logic coupled to said memory bus for generating a cache array address corresponding to a subset of the address signals on said address bus, said address logic including circuitry that replaces at least one predefined bit of said cache array address with a predefined value whenever said memory bus is carrying image data having an address in said predefined portion of said address space, thereby restricting storage of image data in said cache array to cache array addresses with said at least one predefined bit set to said predefined value;

whereby said cache logic means restricts the amount of other data stored in said cache which may be displaced by image data from said at least one frame buffer.

6. In a computer system as set forth in claim 5, said at least one predefined bit of said cache array address including at least one most significant bit of said cache array address.

7. In a computer system as set forth in claim 5, said cache logic means including block writing means for detecting when said processor coupled to said cache means is writing a block of image data to said at least one frame buffer and for writing said block of image data directly to said at least one frame buffer without storing said block of image data in said cache array.

8. In a computer system as set forth in claim 7, wherein said at least one predefined bit of said cache array address including at least one most significant bit of said cache array address.

9. In a computer system having a processor, a main memory coupled to said processor by a memory bus, said main memory storing data at specified addresses within a predefined address space, said memory bus carrying signals which denote addresses to which data is being stored by said processor;

said main memory including at least one frame buffer for storing image data at addresses in a predefined portion of said address space, and other memory for storing additional data in portions of said address space other than said predefined portion;

display means for displaying image data stored in said at least one frame buffer;

cache means coupled to said memory bus and said processor for providing said processor with access to portions of said address space at higher speed than said main memory, said cache means including a direct mapped cache array for storing blocks of data and tag means for denoting what portion of said address space is stored in each of said blocks; said tag means including a tag for each said block of data stored in said cache means, said tag denoting an address value, and a status flag; and said cache means including status logic means for storing an enabled status flag in said cache means whenever a block of image data from said at least one frame buffer is stored in said cache means; wherein said status logic means stores a disabled status flag in said cache means whenever a block of data having an address in the portion of said address space corresponding to said other memory is stored in said cache means, unless said block of data is also stored in another cache means coupled to another processor;

each cache means including cache logic means for automatically writing a block of data stored in said cache means to said main memory whenever said block of data is modified by said processor and said status tag for said block is enabled; said cache logic means furthermore including means for writing to said main memory blocks of data stored in said cache means that have been modified by said processor and that have a disabled status flag in said tag for said block only when said blocks of data are displaced from said cache means;

whereby said cache means always writes modified blocks of image data to said at least one frame buffer.

10. In a computer system as set forth in claim 9, said cache logic means including block writing means for detecting when said processor is writing a block of image data to said at least one frame buffer and for writing said block of image data directly to said at least one frame buffer without storing said block of image data in said cache array.

11. In a computer system as set forth in claim 9, said cache logic means including address circuit means for storing blocks of image data from said at least one frame buffer only in a predefined portion of said cache array, said predefined portion comprising no more than one half of said cache array;

whereby said cache logic means restricts the amount of other data stored in said cache which may be displaced by image data from said at least one frame buffer.

12. In a computer system having a processor, a main memory coupled to said processor by a memory bus, said main memory storing data at specified addresses within a predefined address space, said memory bus including an address bus carrying address signals that denote addresses to which data is being stored and addresses from which data is being retrieved by said processor;

said main memory including at least one frame buffer for storing image data at addresses in a predefined portion of said address space, and other memory for storing additional data in portions of said address space other than said predefined portion;

display means for displaying image data stored in said at least one frame buffer;

cache means coupled to said memory bus and said processor for providing said processor with access to portions of said address space at higher speed than said main memory, said cache means including a direct mapped cache array for storing blocks of data and tag means for denoting what portion of said address space is stored in each of said blocks; said tag means including a tag for each said block of data stored in said cache means;

said cache means including cache logic means for storing blocks of image data from said at least one frame buffer only in a predefined portion of said cache array, said predefined portion comprising no more than one half of said cache array; said cache logic means including address logic coupled to said memory bus for generating a cache array address corresponding to a subset of the address signals on said address bus, said address logic including means for replacing at least one predefined bit of said cache array address with a predefined value whenever said memory bus is carrying image data having an address in said predefined portion of said address space, thereby restricting storage of image data in said cache array to cache array addresses with said at least one predefined bit set to said predefined value;

whereby said cache logic means restricts the amount of other data stored in said cache which may be displaced by image data from said at least one frame buffer.

13. The computer system set forth in claim 12, wherein said at least one predefined bit of said cache array address includes at least one most significant bit of said cache array address.

14. In a computer system as set forth in claim 12, said cache logic means including block writing means for detecting when said processor coupled to said cache means is writing a block of image data to said at least one frame buffer and for writing said block of image data directly to said at least one frame buffer without storing said block of image data in said cache array.

15. The computer system set forth in claim 14, wherein said at least one predefined bit of said cache array address includes at least one most significant bit of said cache array address.

16. In a computer system having a processor, a main memory coupled to said processor by a memory bus, said main memory storing data at specified addresses within a predefined address space, said memory bus including an address bus carrying address signals that denote addresses to which data is being stored and addresses from which data is being retrieved by said processor;

said main memory including at least one frame buffer for storing image data at addresses in a predefined portion of said address space, and other memory for storing additional data in portions of said address space other than said predefined portion;

display means for displaying image data stored in said at least one frame buffer;

cache means coupled to said memory bus and said processor for providing said processor with access to portions of said address space at higher speed than said main memory, said cache means including a direct mapped cache array for storing blocks of data and tag means for denoting what portion of said address space is stored in each of said blocks; said tag means including a tag for each said block of data stored in said cache means;

said cache means including cache logic means for storing blocks of image data from said at least one frame buffer only in a predefined portion of said cache array, said predefined portion comprising no more than one half of said cache array; said cache logic means including address logic coupled to said memory bus for generating a cache array address corresponding to a subset of the address signals on said address bus, said address logic including means for replacing a plurality of predefined bits of said cache array address with a predefined value whenever said memory bus is carrying image data having an address in said predefined portion of said address space, thereby restricting storage of image data in said cache array to cache array addresses with said plurality of predefined bits set to said predefined value;

whereby said cache logic means restricts the amount of other data stored in said cache which may be displaced by image data from said at least one frame buffer.

17. The computer system set forth in claim 16, wherein said plurality of predefined bits of said cache array address includes a plurality of most significant bits of said cache array address.

18. In a computer system as set forth in claim 16, said cache logic means including block writing means for detecting when said processor coupled to said cache means is writing a block of image data to said at least one frame buffer and for writing said block of image data directly to said at least one frame buffer without storing said block of image data in said cache array.

19. The computer system set forth in claim 18, wherein said plurality of predefined bits of said cache array address includes a plurality of most significant bits of said cache array address.

20. In a computer system having a multiplicity of processors, a main memory coupled to said processors by a memory bus, said main memory storing data at specified addresses within a predefined address space, said memory bus including an address bus carrying address signals, said predefined address space being at least partially shared by said multiplicity of processors;

said main memory including at least one frame buffer for storing image data at addresses in a predefined portion of said address space, and other memory for storing additional data in portions of said address space other than said predefined portion;

display means for displaying image data stored in said at least one frame buffer;

a plurality of cache means coupled to said memory bus, each cache means coupled to one of said processors for providing said processor with access to portions of said address space at higher speed than said main memory, each said cache means including a direct mapped cache array for storing blocks of data and tag means for denoting what portion of said address space is stored in each of said blocks; said tag means including a tag for each said block of data stored in said cache means;

each cache means including cache logic means for storing blocks of image data from said at least one frame buffer only in a predefined portion of said cache array, said predefined portion comprising no more than one half of said cache array; said cache logic means including address logic coupled to said memory bus for generating a cache array address corresponding to a subset of the address signals on said address bus, said address logic including means for replacing a plurality of predefined bits of said cache array address with a predefined value whenever said memory bus is carrying image data having an address in said predefined portion of said address space, thereby restricting storage of image data in said cache array to cache array addresses with said plurality of predefined bits set to said predefined value;

whereby said cache logic means restricts the amount of other data stored in said cache which may be displaced by image data from said at least one frame buffer.

21. In a computer system as set forth in claim 20, said plurality of predefined bits of said cache array address including a plurality of most significant bits of said cache array address.

22. In a computer system as set forth in claim 20, said cache logic means including block writing means for detecting when said processor coupled to said cache means is writing a block of image data to said at least one frame buffer and for writing said block of image data directly to said frame buffer without storing said block of image data in said cache array.

23. In a computer system as set forth in claim 22, said plurality of predefined bits of said cache array address including a plurality of most significant bits of said cache array address.

* * * * *